Oct. 20, 1959  C. E. DREW  2,909,376
WORK HOLDING SLEEVE MEMBER
Filed March 26, 1958
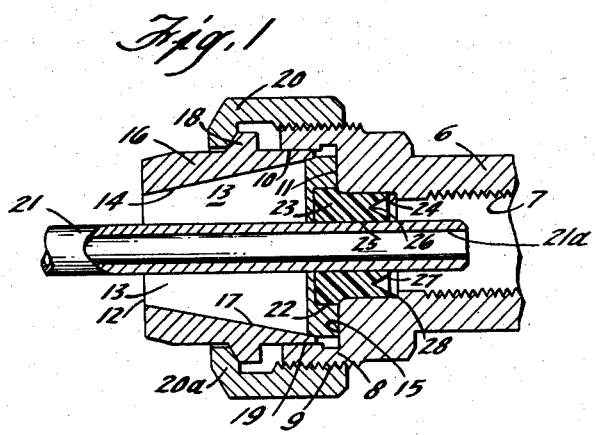
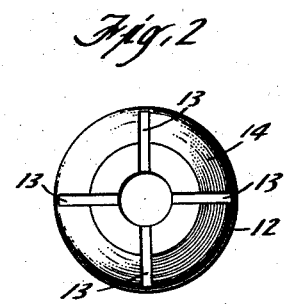
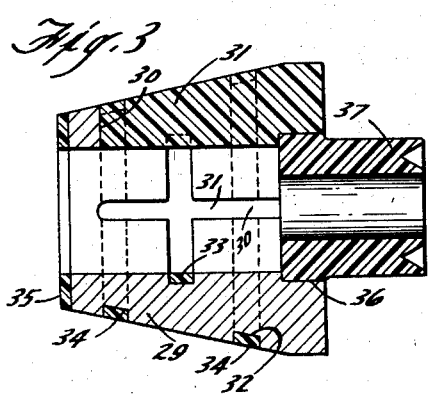
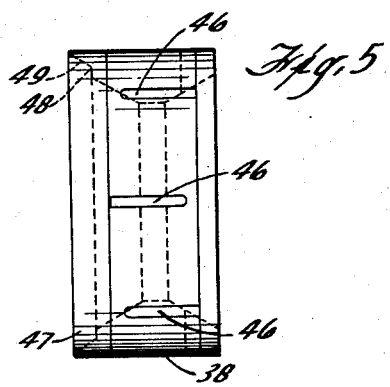
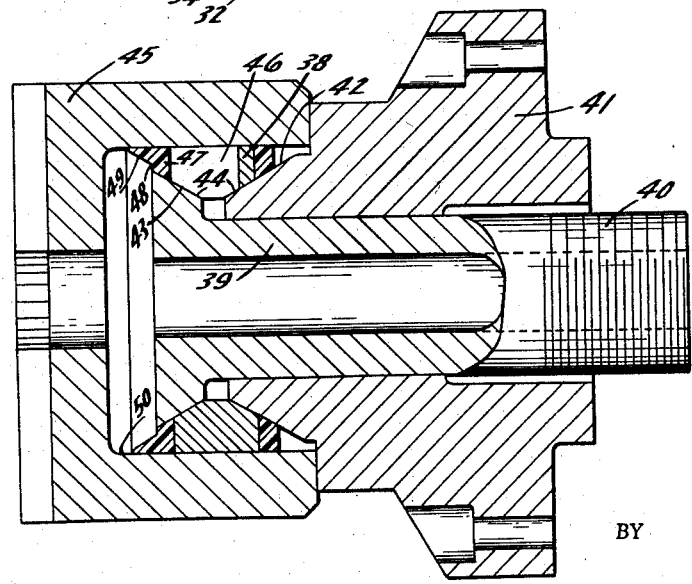
INVENTOR.
Charles E. Drew
BY
Louis O. French
Atty.

2,909,376
WORK HOLDING SLEEVE MEMBER

Charles E. Drew, Racine, Wis.

Application March 26, 1958, Serial No. 724,125

5 Claims. (Cl. 279—20)

The invention relates to expanding or contractible work holding sleeve members such as expanding mandrels or collet chucks and to fixtures for the same.

Sleeve members of the type above defined are provided with a series of lengthwise slots extending inwardly from one end or from opposite ends to permit expansion or contraction of the sleeve into action with the work through pressure applied to the end or ends of the sleeve. Where such sleeves are used for holding a tool having a bore through which a coolant acting as a lubricant for cutting is conducted to the work during cutting, the usual sleeves with their slots provide escape passages for the coolant before it reaches the tool and consequently a reduction in pressure of this lubricant at the tool cutting edges which is objectionable. The object of this invention is to provide a work holding sleeve member having a flexible sealing member incorporated therewith which will prevent the escape of coolant through the sleeve or between the sleeve and the tool so that the full pressure of the coolant will be available at the cutting edge of the tool.

A further object of the invention is to provide a tool chucking sleeve of the type above described in which the flexible oil or coolant sealing ring mounted on said sleeve is so arranged relative to the tool and the sleeve clamping member that the pressure of the coolant on said ring acts to maintain a sealing pressure on said ring.

The invention further consists in the several features hereinafter described and more particularly defined by claims at the conclusion hereof.

In the drawings:

Fig. 1 is a vertical sectional view through a tool holding fixture equipped with a collet type tool clamping sleeve embodying the invention;

Fig. 2 is a front elevational view of the collet;

Fig. 3 is a vertical sectional view of the modification of the collet shown in Fig. 1;

Fig. 4 is a half vertical sectional view through a tool holding fixture equipped with a mandrel type tool clamping sleeve;

Fig. 5 is a plan view of the sleeve shown in Fig. 4.

Referring to Fig. 1, the numeral 6 designates a rotary drive spindle that may be driven in any suitable manner and may be the driven member of a lathe, drill press, milling, boring, or other known types of machines, said spindle having a central conduit 7 and having a head 8 provided with an exterior thread 9 and a cylindrical recess providing a cylindrical guide surface 10 and an annular backing shoulder 11. In some instances the chucks are not mounted on machine tools but are used as non-rotatable fixtures.

A resilient metal sleeve member 12 here shown as a collet chuck is adapted to be clamped to the head end of the spindle. In common with such chucks, the member 12 has a series of lengthwise extending radially disposed slots 13 extending inwardly from its front end and equidistantly circumferentially spaced relative to each other and a conical outer surface 14 and a flat back surface 15 adapted to engage said shoulder. A wedge member or sleeve 16 has a bore 17 tapered to conform to the conical surface 14, an outer annular shoulder 18 and a cylindrical rear end portion 19 slidably mounted on said guide surface 10. A sleeve clamping nut 20 has a threaded engagement at its rear end with the threads 9 of the spindle and a flanged outer end 20a engageable with the shoulder 18 so that as said nut is screwed up on the spindle 6, it will draw the sleeve 16 toward the right as viewed in Fig. 1 and act to contract the slotted portion of the collet 12 into clamping engagement with the hollow shank 21 of any suitable tool such as a drill, milling cutter or boring bar. The shank has the conduit 21a by which coolant under pressure is conducted from the conduit 7 to the cutting face or faces of the tool as it acts on the work. The construction above described so far is old, and with the usual form or forms of slotted collets coolant from the conduit 7 can escape through the collet so that some of it does not reach the cutting edge of the tool and so that the full pressure of coolant at the cutting edges of the tool is not available.

To overcome the above difficulty I have provided an annular anchoring recess 22 at the back end of the collet adapted to receive the base end of a ring 23 of flexible packing material, preferably a suitable elastic plastic composition which can be bonded to the body of the collet. The ring has a body portion closely fitting the smooth bore 24 of the conduit 7 and a bore 25 of a configuration to fit the outer surface of the tool shank 21, it being noted that while the tool shank is shown as circular, other forms of tool shanks may be used and the collet bore and the sleeve formed to take such shanks. The front face of the ring is preferably formed to provide a V-groove 26 that provides sealing lip portions 27 and 28 which under the action of the pressure fluid coolant are forced outwardly against the surface of the shank 21 and bore 24, respectively, to seal against the escape of coolant and thereby compel all of the coolant to flow through the shank 21 to the cutting face of the tool.

Instead of a collet having open slots, I may also use a collet having plastic filled slots of the type shown in the application of Charles E. Drew and John T. Cochran, Serial No. 469,612, filed November 18, 1954, now Patent No. 2,829,899, for Work Holding Sleeve Member, and Fig. 3 shows such a collet with the present invention applied thereto. In this instance the collet 29 has slots 30 extending inwardly from each end and equidistantly circumferentially spaced relative to each other, and the series of slots from one end are equidistantly circumferentially offset from the series of slots from the other end. The slots 30 extending from the inner end have been indicated, and for further details reference is made to said application. The slots 30 are filled with a yieldable filler material 31, such as a suitable yieldable plastic composition. Synthetic rubber or rubber-like plastics are suitable for the filler material. To hold the filler in place, annular grooves 32 and one or more annular grooves 33 are formed in the collet body and filled with filler material 34 similar to the material 31 or compatible and cooperating therewith to form a series of holding bands. The sleeve also has an end wiper of yieldable material 35 and the annual grooved portion 36 of the back now has the sealing ring 37 of yieldable material similar to the filler 34 or compatible therewith mounted therein in a bonded relation, the ring 37 being identical with the ring 23 previously described and functioning similarly to seal the space between the tool and the fixture of the type shown in Fig. 1.

Figs. 4 and 5 show a sleeve member 38 of the expanding mandrel form applied to a fixture of the general type shown in my prior Patent No. 2,789,825, dated April 23, 1957, except that in this case the drawbar pin 39 is a hollow conically headed sleeve member exteriorly threaded at its rear end 40 for connection with a hollow drawbar, not shown. The other half of the structure shown in Fig. 4 is symmetrical with that shown. The fixture herein includes a chuck member 41 adapted to be bolted to a face plate, not shown, or other rotating part of a lathe, milling, or other machine tool and provided with a conically faced end 42 that cooperates with the conical surface 43 of the drawpin 39 to engage corresponding tapered annular surfaces 44 of the mandrel 38 to expand the same into clamping engagement with the tubular shank 45 of a tool, here shown for example as an end mill, though other types of cutters or drills may be used, if desired. Similar to the mandrel shown in said patent, the mandrel 38 has a series of circumferentially spaced lengthwise extending slots 46 extending inwardly from its ends, the slots at one end being circumferentially offset from those at the other end as indicated in Fig. 5. At its front end the mandrel has a ring 47 of elastically yieldable material, such as a suitable rubber-like plastic, bonded or otherwise suitably secured thereto, said ring having a grooved face 48 that includes a forwardly projecting lip portion 49 that is adapted to engage the bore 50 in the shank 45 of the tool.

With the last described construction, coolant is confined to the passage in draw pin 39 and the hollow end of the tool by the sealing ring 47 so that it cannot escape through the slots in the mandrel or through any clearances that might otherwise exist between the mandrel and the tool that would tend to reduce the pressure in the coolant at the cutting edge of the tool. The pressure of the coolant acting on the grooved face of the ring 47 aids in maintaining its seal with the parts between which it is interposed.

Instead of the plain type of mandrel 38, a mandrel in which the slots are provided with a yieldable filler, as shown in the aforementioned application, may be used with a sealing ring similar to the ring 47 mounted at the front end thereof.

It is also to be noted that other forms of expandable and contractible collets or mandrels may be used in connection with the sealing ring above described without departing from the invention.

I desire it to be understood that this invention is not to be limited to any particular form or arrangement of parts except in so far as such limitations are included in the appended claims.

What I claim as my invention is:

1. In a tool in which coolant is conveyed under pressure to the face of a cutting tool through the tool of the character described, the combination of a contractible or expansible work holding metal sleeve member for holding the tool in stationary relationship therewith, and adapted at one end thereof to engage and retain a coolant sealing member; said sealing member comprising an elastically yieldable sealing ring mounted on and secured to said one end of said sleeve member and engaging at one side with the tool carried by said sleeve and on its other side with a tool fixture to prevent escape of coolant before it reaches the cutting face of the tool; said sealing ring including a coolant sealing surface yieldable under the said coolant pressure in a direction towards said engagement to complete the seal therebetween.

2. The structure as defined in claim 1, wherein the metal sleeve is a collet chuck and the sealing ring projects at the rear end of said chuck and is disposed between the shank of the tool and a bore in the fixture.

3. The structure as defined in claim 1, wherein the metal sleeve is a collet chuck and sealing ring projects at the rear end of said chuck between the shank of the tool and the bore of the fixture and has a grooved front face to provide coolant pressure exposed sealing lips.

4. The structure as defined in claim 1, wherein the metal sleeve is a flexible walled mandrel having the sealing ring mounted at its front end between a bore in the shank of the tool and a surface of the fixture.

5. The structure as defined in claim 4, wherein the sealing ring has a forwardly projecting lip portion engageable under coolant pressure with a bore in the shank of the tool.

References Cited in the file of this patent

UNITED STATES PATENTS

| | | |
|---|---|---|
| 1,684,826 | Hill | Sept. 18, 1928 |
| 2,626,840 | Laurent | Jan. 27, 1953 |
| 2,731,538 | Sherman et al. | Jan. 17, 1956 |